(12) United States Patent
Kondo et al.

(10) Patent No.: US 9,591,096 B2
(45) Date of Patent: Mar. 7, 2017

(54) COMPUTER SYSTEM, CACHE CONTROL METHOD, AND SERVER

(71) Applicant: HITACHI, LTD., Tokyo (JP)

(72) Inventors: Nobukazu Kondo, Tokyo (JP); Yuusuke Fukumura, Tokyo (JP); Ken Sugimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 14/287,250

(22) Filed: May 27, 2014

(65) Prior Publication Data

US 2014/0359063 A1 Dec. 4, 2014

(30) Foreign Application Priority Data

May 28, 2013 (JP) ................................. 2013-111694

(51) Int. Cl.
*G06F 15/16* (2006.01)
*H04L 29/08* (2006.01)

(52) U.S. Cl.
CPC .............................. *H04L 67/2852* (2013.01)

(58) Field of Classification Search
USPC ................................. 709/212, 213, 216, 217
See application file for complete search history.

(56) References Cited

U.S. PATENT DOCUMENTS 6,349,358 B1 * 2/2002 Kuwata ............... G06F 12/0862
  711/113
8,402,238 B2 * 3/2013 Saito .................... G06F 3/0613
  711/112
2004/0039869 A1 * 2/2004 Kurokawa .......... G06F 12/0862
  711/100
2009/0024793 A1 * 1/2009 Fontenot ............... G06F 3/0607
  711/115
2011/0087833 A1 * 4/2011 Jones .................. G06F 12/0866
  711/104
2012/0047330 A1 * 2/2012 Rago ................... G06F 12/0888
  711/133
2012/0297113 A1 * 11/2012 Belluomini ......... G06F 12/0866
  711/103

FOREIGN PATENT DOCUMENTS

JP 2002-99465 A 4/2002

OTHER PUBLICATIONS

Japanese Office Action received in corresponding Japanese Application No. 2013-111694 dated Sep. 6, 2016.

* cited by examiner

*Primary Examiner* — Liangche A Wang
(74) *Attorney, Agent, or Firm* — Mattingly & Malur, PC

(57) ABSTRACT

A computer system, comprising: a server on which an application providing a service runs; and a storage system for storing data, the server including a cache device in which a server cache for temporarily storing data is set up, and an operating system for controlling the server, the operating system including a cache driver for controlling the server cache, wherein the operating system is configured to hold access information storing a frequency of reading data and a frequency of writing data, and wherein the cache driver is configured to: update the access information in a case where an I/O request; analyze access characteristics of data that is a target for the I/O request based on the access information; and determine whether to store the data that is the target for the I/O request in the server cache.

7 Claims, 14 Drawing Sheets

ACCESS INFORMATION

| BLOCK NUMBER | ACCESS TYPE | |
| --- | --- | --- |
| | Read | Write |
| 0 | 0 | 0 |
| 1 | 8 | 1 |
| 2 | 0 | 0 |
| 3 | 9 | 0 |
| 4 | 0 | 0 |
| 5 | 8 | 7 |
| 6 | 0 | 0 |
| 7 | 0 | 0 |
| 8 | 9 | 3 |
| 9 | 0 | 0 |
| ⋮ | ⋮ | ⋮ |

*Fig. 3*

ACCESS INFORMATION

| FILE ID | BLOCK NUMBER | ACCESS TYPE | |
| --- | --- | --- | --- |
| | | Read | Write |
| FILE A | 0 | 0 | 0 |
| | 3 | 8 | 1 |
| | 5 | 0 | 0 |
| | 6 | 9 | 0 |
| | 8 | 0 | 0 |
| FILE B | 1 | 8 | 7 |
| | 4 | 0 | 0 |
| | 7 | 0 | 0 |
| FILE C | 2 | 9 | 3 |
| | 9 | 0 | 0 |
| ⋮ | ⋮ | ⋮ | ⋮ |

*Fig. 10*

COMPUTER SYSTEM, CACHE CONTROL METHOD, AND SERVER

CLAIM OF PRIORITY

The present application claims priority from Japanese patent application JP 2013-111694 filed on May 28, 2013, the content of which is hereby incorporated by reference into this application.

BACKGROUND OF THE INVENTION

This invention relates to cache control in I/O processing using a cache area provided in a server and a storage system.

In recent years, nonvolatile memories (NVM) such as a flash memory are used in various electronic devices. Unlike a hard disk drive (HDD), the nonvolatile memory does not involve a mechanical operation, and permits faster access than the HDD.

Nonvolatile memories are also used in enterprise applications such as a server and a storage system that need fast data access. Particularly, nonvolatile memories mountable in servers become inexpensive, and are thus becoming popular.

There have been proposed various computer systems that achieve fast data access by using a volatile memory and a nonvolatile memory which are included in a server (see, for example, the description of US 2009/0024793 A1). US 2009/0024793 A1 describes cache control in a system having a memory for data cache different from a main memory. When writing of data onto a disk is detected, for example, a device driver determines whether or not the data can be written into the memory for data cache, pushes out data from the memory for data cache if necessary, and writes the requested data therein.

SUMMARY OF THE INVENTION

Related-art cache control methods employ a least recently used (LRU) approach, a most recently used (MRU) approach, a least frequently used (LFU) approach, or the like.

According to the LRU approach, least recently used data is removed from a cache. According to the MRU approach, most recently used data is removed from a cache. According to the LFU approach, least frequently used data is removed from a cache.

However, mere use of the related-art cache control methods cannot achieve cache control that optimizes the performance of a computer system. Cache control using the LRU approach is described by way of example.

In a case where data which is frequently read by an application is stored in a server cache, the data is removed from the server cache when the data has not been accessed for a long period of time since the last access. In this case, the data needs to be read from the storage system, which lowers the processing performance of the application. In a case where data which is frequently read by an application is stored only in a storage cache, the server frequently transmits a read request for the data. This increases the reading load on the storage system, which lowers the writing performance in the storage system.

Further, set-up for cache control is complicated, and puts a great burden on a user.

Even the use of the technology described in US 2009/0024793 A1 brings about the above-mentioned problem.

This invention has been made in view of the above-mentioned problem. Accordingly, this invention provides a system and method for achieving cache control that automatically optimizes the processing performance of a computer system.

The present invention can be appreciated by the description which follows in conjunction with the following figures, wherein: a computer system, comprising: a server on which an application providing a service runs; and a storage system for storing data to be used by the application. The server includes a first processor, a first memory, a cache device in which a server cache for temporarily storing data is set up, and a first interface for coupling to another apparatus. The storage system includes a controller and a plurality of storage devices. The controller includes a second processor, a second memory, and a second interface for coupling to another apparatus. The server includes an operating system for controlling the server. The storage system includes a storage cache for temporarily storing data and a storage control part for controlling the storage system. The operating system including a cache driver for controlling the server cache. The operating system is configured to hold access information storing a frequency of reading data and a frequency of writing data. The cache driver is configured to: update the access information in a case where an I/O request is received from the application; analyze access characteristics of data that is a target for the I/O request based on the updated access information; and determine whether to store the data that is the target for the I/O request in the server cache based on a result of analysis of the access characteristics.

Controlling data to be stored into the server cache based on the data access characteristics of the application can improve the processing performance of the computer system.

BRIEF DESCRIPTION OF THE DRAWINGS

The present invention can be appreciated by the description which follows in conjunction with the following figures, wherein:

FIG. 3 is an explanatory diagram illustrating an example of access information according to the first embodiment of this invention;

FIG. 10 is an explanatory diagram illustrating an example of the access information according to a third embodiment of this invention.

DETAILED DESCRIPTION OF THE PREFERRED EMBODIMENTS

Figure 1:
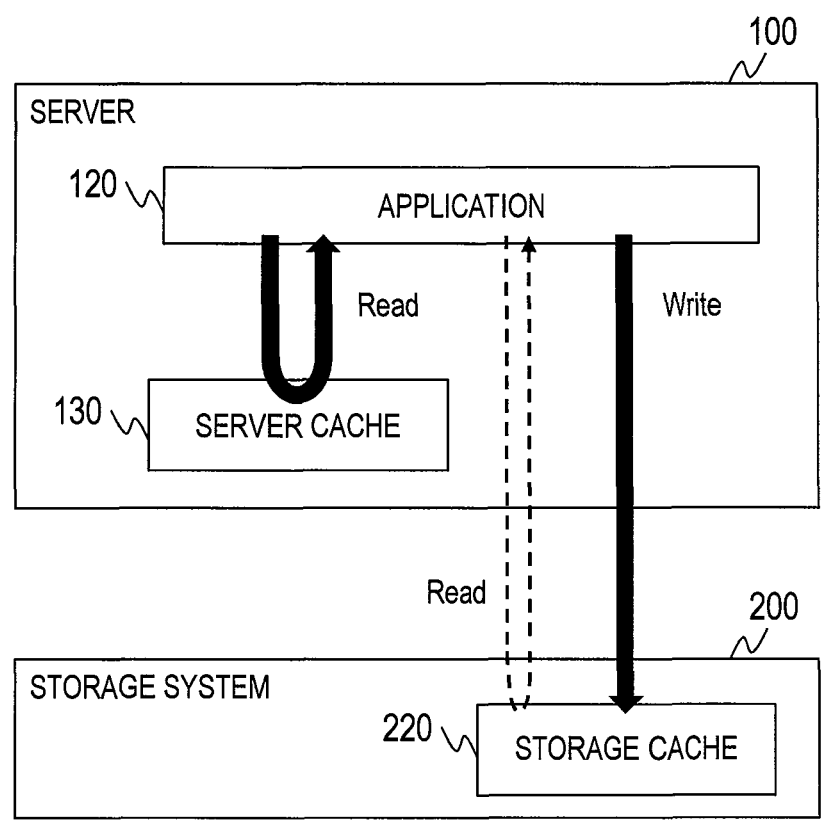
FIG. 1 is a block diagram illustrating the outline of this invention.

Embodiments of this invention are described hereafter referring to the drawings.

FIG. 1 is a block diagram illustrating the outline of this invention.

According to this invention, a server 100 controls data to be stored into a server cache 130. Specifically, the server 100 stores data which is frequently read by an application 120 into the server cache 130. Meanwhile, the server 100 performs such control as to prevent data which is frequently written from being stored into the server cache 130.

Figure 2:
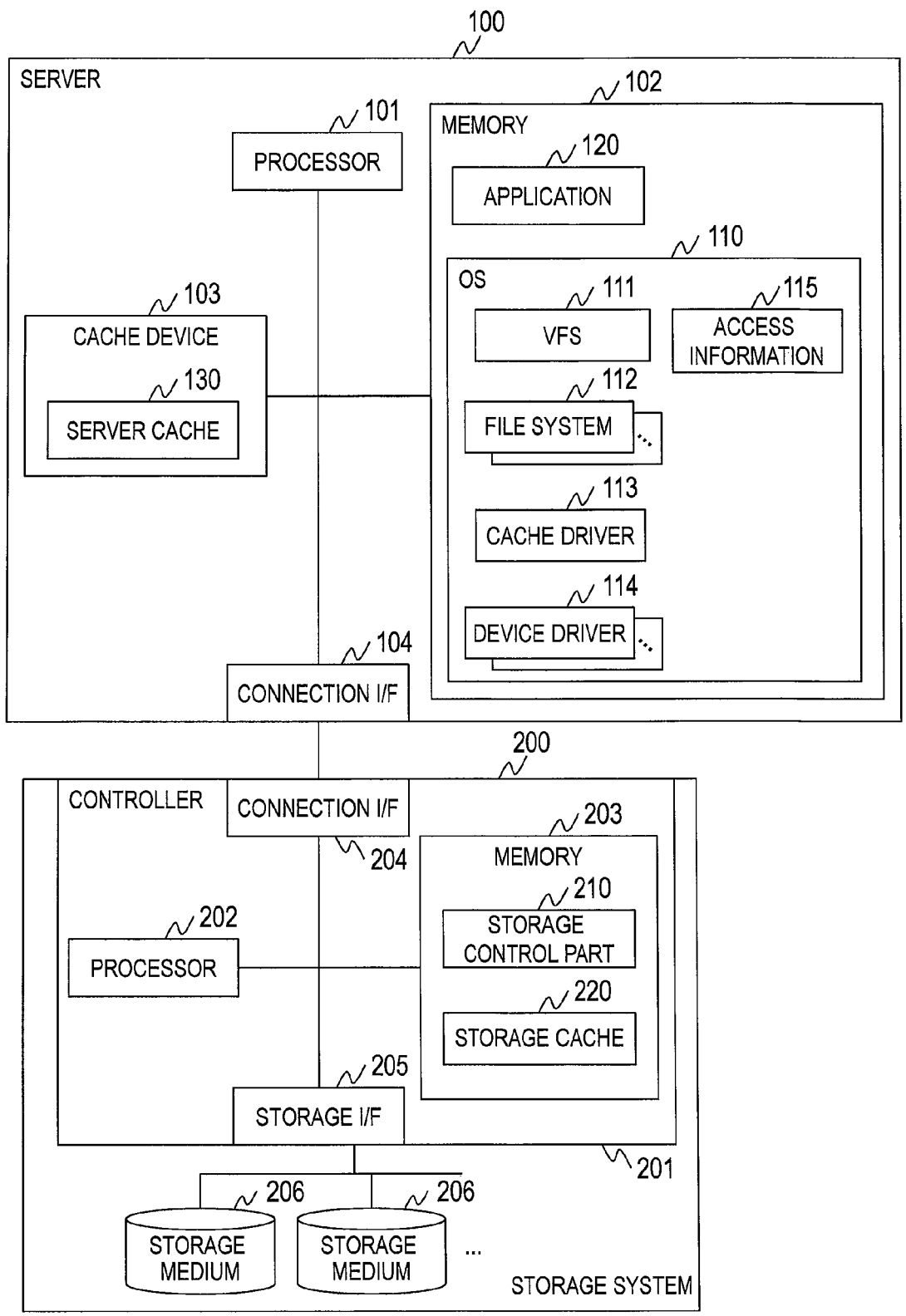
FIG. 2 is a block diagram illustrating an example of the configuration of a computer system according to a first embodiment of this invention.

In a case of reading data from a storage medium 206 illustrated in FIG. 2, a storage system 200 stores the data read from the storage medium 206 illustrated in FIG. 2 into a storage cache 220. In writing data into the storage medium 206 illustrated in FIG. 2, the storage system 200 stores the data into the storage cache 220. This caching process can improve the reading and writing performances.

According to this invention, the server 100 performs the above-mentioned cache control to bring about an access state illustrated in FIG. 1. Specifically, data which is frequently read is stored into the server cache 130, and data which is written into the storage medium 206 is stored into the storage cache 220.

Therefore, this invention demonstrates the following effects.

First, in a case of receiving a read request for data from the application 120, the server 100 can read the data from the server cache 130 without accessing the storage system 200. This enables fast data reading.

Secondly, data which is frequently written is not stored into the server cache 130, thereby suppressing the writing-originated degradation of the performance of the server cache 130. In general, a flash memory which is used as the server cache 130 is limited in the frequency of writing, and hence frequent writing of data degrades the flash memory. Accordingly, reducing the frequency of writing to the flash memory can suppress degradation of the performance of the server cache 130.

Thirdly, the number of read requests to be transmitted from the server 100 is reduced, and hence the storage system 200 can perform the writing process to the performance limit of the storage system 200.

Fourthly, the above-mentioned cache control is automatically executed by the server 100 based on the access characteristics of data. Therefore, a system administrator or a user or the like who uses the application 120 need not set up information on cache control beforehand.

First Embodiment

FIG. 2 is a block diagram illustrating an example of the configuration of a computer system according to a first embodiment of this invention.

The computer according to this embodiment includes the server 100 and the storage system 200. FIG. 2 illustrates the computer system including a single server 100 and a single storage system 200, but this invention is not limited thereto. The computer system may include a plurality of servers 100 and a plurality of storage systems 200.

The server 100 and the storage system 200 are coupled to each other over a local area network (LAN) or a storage area network (SAN). It should be noted that the computer system may include the server 100 and the storage system 200 within the same casing. In this case, the server 100 and the storage system 200 are connected to each other via a backplane. The server 100 may be directly connected to the storage system 200.

The server 100 is a computer that performs predetermined services. The server 100 includes a processor 101, a memory 102, a cache device 103, and a connection interface 104, which are interconnected by internal buses. The server 100 may include a storage apparatus and an input/output apparatus. The storage apparatus may be, for example, an HDD. The input/output apparatus includes a keyboard, a mouse, a touch panel, and a display.

The processor 101 runs a program stored in the memory 102. The execution of the program by the processor 101 achieves the functions of the server 100. In the following description, processes, which are described to be carried out mainly by the program, imply that the program is run by the processor 101.

The memory 102 stores a program to be run by the processor 101 and information needed to run the program. The program and information, which are to be stored in the memory 102, are described later.

The cache device 103 achieves the server cache 130 that temporarily stores data. The entire storage area of the cache device 103 is used as the server cache 130.

According to this embodiment, it is assumed that a solid state drive (SSD) having a flash memory is used as the cache device 103. It should be noted that the cache device 103 is not limited to a nonvolatile memory such as a flash memory. For example, a volatile memory such as a DRAM may be used.

In this embodiment, the server cache 130 stores a plurality of pieces of data which are stored logical blocks of an Logical unit (LU). For example, a buffer cache may be used. The buffer cache is generated by allocating a buffer page to the server cache 130 and segmenting the buffer page into block buffers of a predetermined block size.

The buffer cache includes a buffer head for specifying a storage location for each of the plurality of pieces of logical block data. It should be noted that an LU is provided by the storage system 200 as described later.

In the following description, logical block data is also described as block data.

The connection interface 104 is a device for connection to an external apparatus such as the storage system 200. When the server 100 is coupled to the storage system 200 over a SAN, for example, a fiber channel (FC) adapter card is used as the connection interface 104. When the server 100 is coupled to the storage system 200 over a LAN, a network interface card (NIC) is used as the connection interface 104.

Next, the program and information to be stored in the memory 102 are described. The memory 102 according to this embodiment stores programs that achieve an operating system (OS) 110 and the application 120. The memory 102 may store another program and information.

The OS 110 provides a function to control the server 100, and controls data transfer between the server 100 and the storage system 200. The OS 110 includes a virtual file system (VFS) 111, a file system 112, a cache driver 113, a device driver 114, and access information 115. The OS 110 includes function units (not shown), which are known and are not therefore described.

The VFS 111 provides a plurality of kinds of file systems 112 with a common interface. The VFS 111 converts an operation (reading, writing, or the like) on data by the application 120 into an operation which depends on each file system 112. Accordingly, the application 120 can use the same operation to access devices of different file systems.

Further, the VFS 111 holds management information of the file systems 112, and information unique to each file system 112. For example, the VFS 111 holds a super block object, inode object, file object, dentry object, and so forth.

The file system 112 provides a function for managing data to be stored into a storage medium as a file. In this embodiment, it is assumed that a plurality of file systems 112 exist. The OS 110 may include a single file system 112.

The OS 110 formats the LU provided by the storage system 200 to predetermined file systems 112. At the time of formatting, the OS 110 divides the LU into predetermined logical blocks, and assigns identification numbers to the respective logical blocks. The file system 112 manages data including at least one block data as a file.

The cache driver 113 controls the cache device 103. The device driver 114 controls devices, such as the connection interface 104, included in the server 100.

The access information 115 stores information on access characteristics of data. The details of the access information 115 are given later referring to FIG. 3.

The application 120 performs a predetermined service. This invention is not limited to the type and the contents of the service of the application 120 that runs on the server 100.

The program and information to be stored in the memory 102 may be stored in the storage system 200 or a storage apparatus provided in the server 100. In this case, the processor 101 acquires the program and information from the storage system 200 or the storage apparatus, and loads the acquired program and information into the memory 102.

The storage system 200 provides a storage area to be used for a service that is performed by the server 100. The storage system 200 includes a controller 201 and a plurality of storage media 206, which are interconnected by internal buses.

The controller 201 controls the storage system 200, and controls data transfer between the server 100 and the storage system 200. The controller 201 includes a processor 202, a memory 203, a connection interface 204, and a storage interface 205, which are interconnected by internal buses.

The processor 202 runs a program stored in the memory 203. The execution of the program by the processor 202 achieves the functions of the storage system 200. In the following description, processes that are described to be carried out mainly by the program imply that the program is run by the processor 202.

The memory 203 stores a program to be run by the processor 202 and information needed to run the program. The program and information that are to be stored in the memory 203 are described later. The memory 203 includes the storage cache 220 that is a storage area for temporarily storing data. The storage cache 220 temporarily stores the data accessed by the server 100

In a case of receiving a read request from the server 100, the storage system 200 returns data stored in the storage cache 220. In a case of receiving a write request from the server 100, the storage system 200 writes data into the storage cache 220, notifies the server 100 of the completion of the writing process, and then writes the data into the storage medium 206. The above-mentioned processing can speed up the response to the server 100.

The connection interface 204 is a device for connection to an external apparatus such as the server 100. When the server 100 is coupled to the storage system 200 over a SAN, for example, a channel adapter (CA) is used as the connection interface 204. When the server 100 is coupled to the storage system 200 over a LAN, a NIC is used as the connection interface 204.

The storage interface 205 is a device for connection to the storage media 206. The storage medium 206 is a device for storing data. For example, the storage medium 206 may be an HDD or SSD. It should be noted that the storage medium 206 may be any device that can store data.

Next, the program and information to be stored in the memory 203 are described. The memory 203 according to this embodiment stores a program that achieves a storage control part 210. The memory 203 may store another program and information. For example, the memory 203 may store information for managing data to be stored in the storage medium 206.

The storage control part 210 controls the storage system 200. According to this embodiment, a plurality of storage media 206 are used to configure a RAID. The storage control part 210 logically divides the RAID volume to generate a plurality of LUs. The storage control part 210 also provides the server 100 with the generated plurality of LUs.

The storage control part 210 holds management information indicating the correlation between the LUs and the storage media 206. In a case of receiving an access request for an LU from the server 100, the storage control part 210 accesses the storage medium 206 that provides a storage area (logical block) forming the LU based on the management information. The storage control part 210 also has various functions including an LU managing function, a data transfer function, and a cache control function, which are known and are not therefore described.

The program and information to be stored in the memory 203 may be stored in the storage medium 206. In this case, the processor 202 reads the program and information from the storage medium 206, and loads the read program and information into the memory 203.

Although the storage cache 220 is set on the memory 203 of the storage, this invention is not limited to this architecture. The controller 201 may include a caching memory. The caching memory may be any one of a nonvolatile memory and a volatile memory.

FIG. 3 is an explanatory diagram illustrating an example of the access information 115 according to the first embodiment of this invention.

The access information 115 includes a block number 301 and an access type 302.

The block number 301 is the block number of a logical block. The access type 302 indicates the type of access. Specifically, there are two access types: Read 303 and Write 304.

The example illustrated in FIG. 3 shows that block data with the block number 301 of "1" is read "8" times and is written "1" time.

It should be noted that the access information 115 may not include the entries of all the logical blocks of an LU. For example, the access information 115 may include the entries of logical blocks that have been accessed at least once.

Figure 4A:
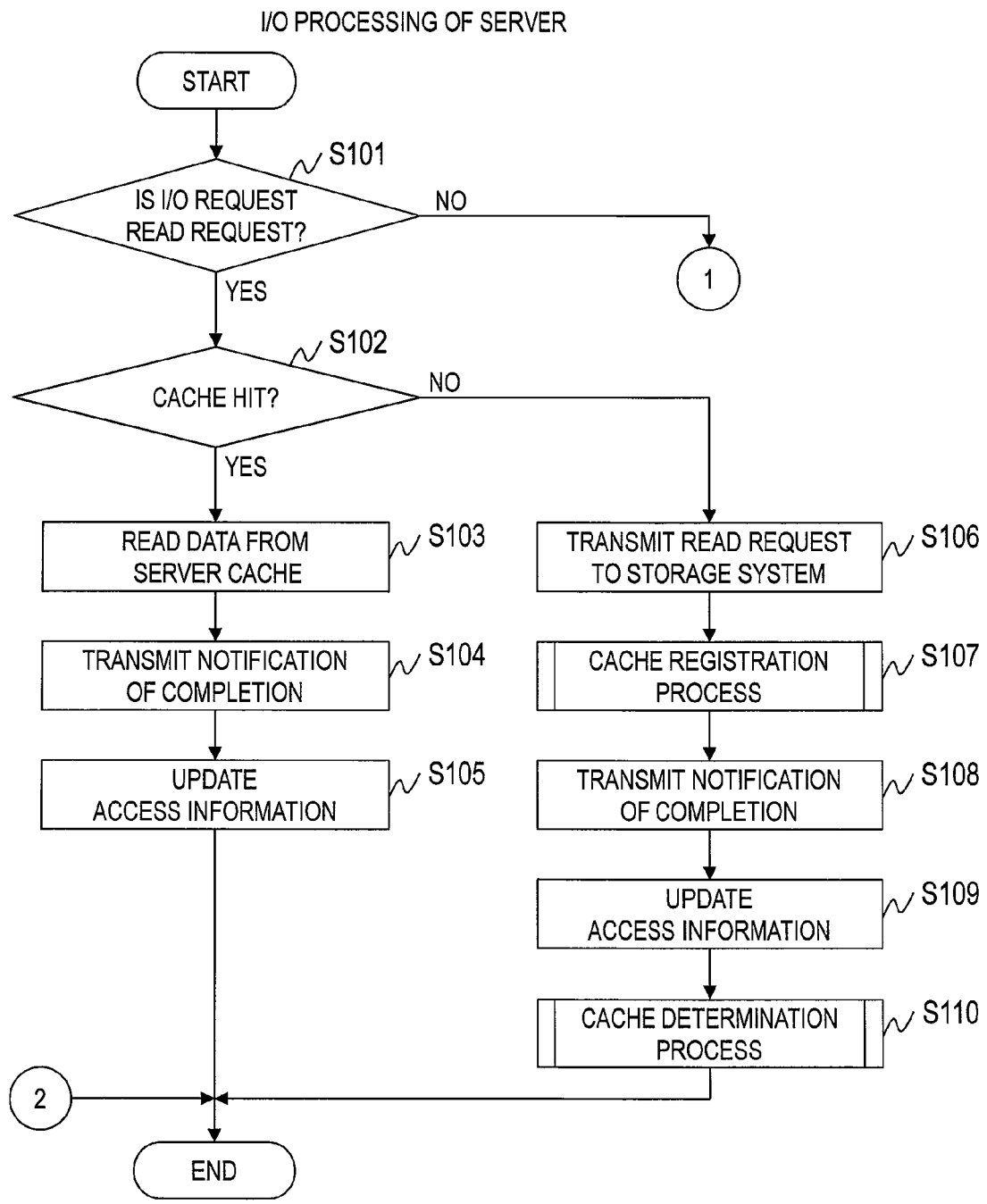
FIGS. 4A and 4B are flowcharts illustrating an example of I/O processing that is performed by a server according to the first embodiment of this invention.
Figure 4B:
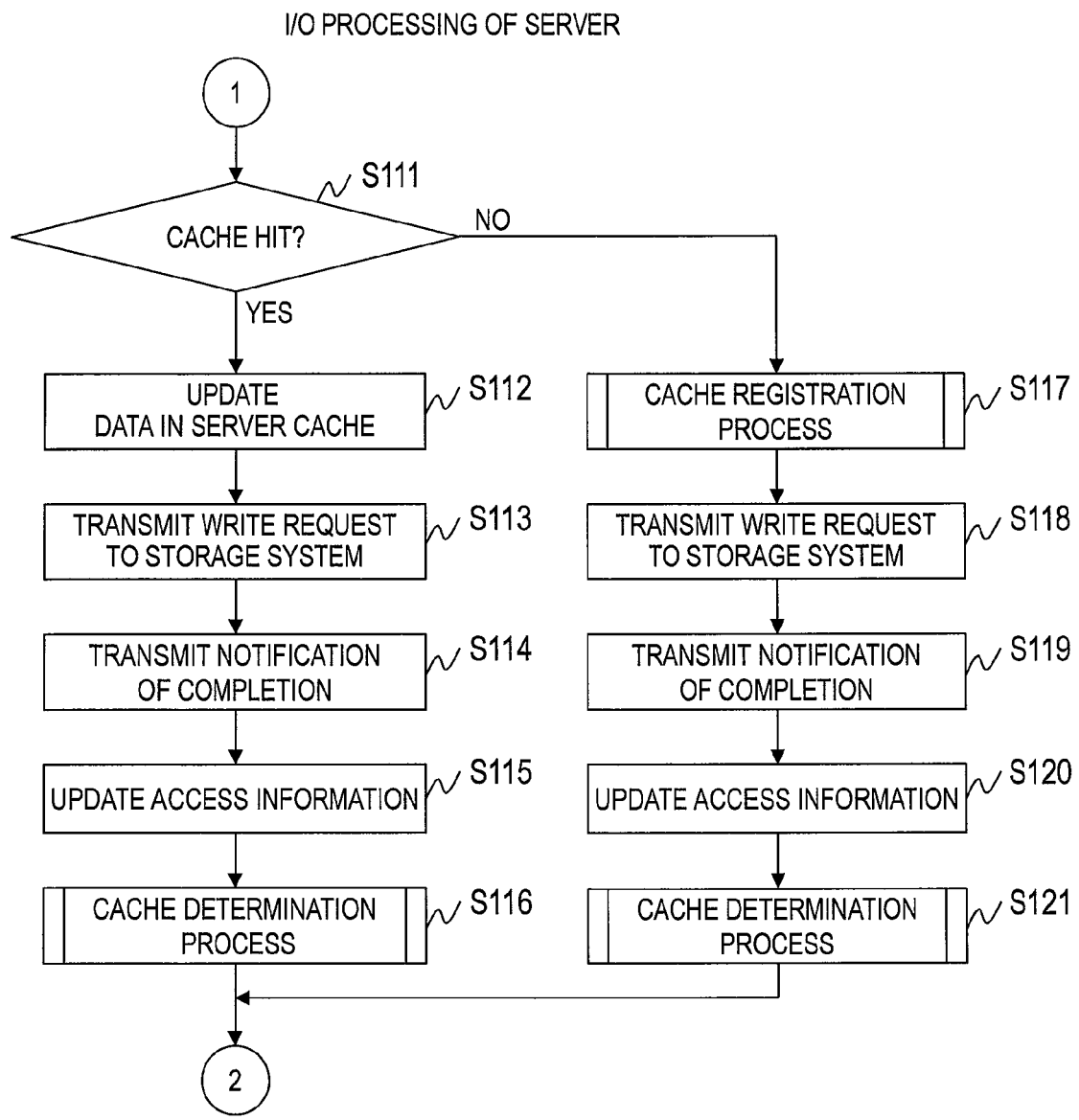

FIGS. 4A and 4B are flowcharts illustrating an example of I/O processing that is performed by the server 100 according to the first embodiment of this invention.

In a case of receiving an I/O request from the application 120, the OS 110 starts I/O processing to be described below. The I/O request includes information identifying a file to be accessed or information identifying block data to be accessed. For example, the I/O request includes a file name or the like in a case where a file is to be accessed, or includes a block number or the like in a case where block data is to be accessed. According to this embodiment, it is assumed that the I/O request includes a file name.

The OS 110 determines whether or not the I/O request is a read request (Step S101).

In a case where it is determined that the I/O request is a read request, the OS 110 determines whether or not data to be read is present in the server cache 130 (Step S102). Specifically, the following process is performed.

The VFS 111 requests a file system 112 that manages a file to be read to read the file. The file system 112 calls the cache driver 113, and instructs the cache driver 113 to retrieve block data of the file to be read. This instruction includes information specifying the block number of block data in a file to be read. In the following description, information specifying the block number of block data in a file is also described as block obtaining information.

The cache driver 113 specifies the block number of block data in a file based on the block obtaining information. In a case where the file includes a plurality of pieces of block data, the cache driver 113 specifies the block number of every block data included in the file.

The cache driver 113 retrieves block data of a file to be read from among the block data stored in the server cache 130. While the detailed description of the method of retrieving block data based on a block number, which is a known technology, is omitted, block data is retrieved based on, for example, a buffer head.

In a case where the block data of a file to be read is present, the cache driver 113 outputs the block data to the VFS 111. In a case where the block data of a file to be read is not present, the cache driver 113 notifies the VFS 111 that the block data is not present.

In a case where at least one block data in a file including a plurality of pieces of block data is not present in the server cache 130, the cache driver 113 notifies the VFS 111 of the absence of block data.

The above is the description of the process of Step S102.

In a case where it is determined that the block data of a file to be read is present in the server cache 130, the OS 110 reads data from the server cache 130 (Step S103), and transmits a notification of completion of the reading process to the application 120 (Step S104). Moreover, the OS 110 updates the access information 115 (Step S105), and terminates the processing. Specifically, the following process is performed.

The cache driver 113 outputs the retrieved block data to the VFS 111. The VFS 111 outputs the block data obtained from the cache driver 113 along with the notification of completion to the application 120.

Further, the cache driver 113 refers to the block number 301 in the access information 115 to retrieve an entry corresponding to the block number of the read block data. The cache driver 113 increments the value of Read 303 of the retrieved entry by "1."

The above is the description of the processes of Steps S103, S104, and S105.

In a case where it is determined in Step S102 that the block data of a file to be read is not present in the server cache 130, the OS 110 transmits a read request to the storage system 200 (Step S106). Specifically, the following process is performed.

The cache driver 113 registers the read request based on the block obtaining information, and calls the device driver 114. It should be noted that the processing of the application stands by until the application receives the notification of completion of all the registered read requests from the device driver 114.

The device driver 114 transmits the read request to the storage system 200 based on the registered read request.

The above is the description of the process of Step S106.

The OS 110 executes a cache registration process for storing data read from the storage system 200 into the server cache 130 (Step S107). Specifically, the following process is performed.

The device driver 114 outputs a notification of completion including block data of a file from the storage system 200 to the cache driver 113.

In a case of receiving the notification of completion from the device driver 114, the cache driver 113 starts the cache registration process. The details of the cache registration process are given later referring to FIG. 6.

The above is the description of the process of Step S107.

After receiving the notification of completion of all the registered reading processes, the OS 110 transmits the notification of completion to the application 120 (Step S108). Further, the OS 110 updates the access information 115 (Step S109). Specifically, the following process is performed.

In a case of receiving the notification of completion of all the registered read requests, the cache driver 113 outputs block data to be stored into the server cache 130 to the VFS 111. The VFS 111 outputs this block data to the application 120 along with the notification of completion.

In addition, the cache driver 113 refers to the block number 301 in the access information 115 to retrieve an entry corresponding to the block number of the block data included in the notification of completion. The cache driver 113 increments the value of Read 303 of the retrieved entry by "1."

The above is the description of the processes of Steps S108 and S109.

The OS 110 executes a cache determination process (Step S110), and then terminates the processing. Specifically, the cache driver 113 executes the cache determination process. The details of the cache determination process are given later referring to FIGS. 5A and 5B.

In a case where it is determined in Step S101 that the I/O request is not a read request, in other words, the I/O request is a write request, the OS 110 determines whether or not block data of a file to be written is present in the server cache 130 (Step S111). The process of Step S111 is the same as the process of Step S102, and hence its description is omitted.

In a case where it is determined that block data of a file to be written is present in the server cache 130, the OS 110 updates block data stored in the server cache 130 (Step S112). Further, the OS 110 transmits a write request to the storage system 200 (Step S113), and transmits a notification of completion to the application 120 (Step S114). Moreover, the OS 110 updates the access information 115 (Step S115). Specifically, the following process is performed.

The cache driver 113 overwrites new block data in the buffer cache where the retrieved block data is stored.

The cache driver 113 registers the write request based on block obtaining information, and calls the device driver 114. The cache driver 113 outputs a notification of completion to the VFS 111. The VFS 111 outputs the notification of completion to the application 120.

The device driver 114 transmits a write request to the storage system 200 based on the registered write request.

The cache driver 113 refers to the block number 301 in the access information 115 to retrieve an entry corresponding to the block number of the overwritten block data. The cache driver 113 increments the value of Write 304 of the retrieved entry by "1."

The above is the description of the processes of Steps S112, S113, S114 and S115.

The OS 110 executes a cache determination process (Step S116), and then terminates the processing. Specifically, the cache driver 113 executes the cache determination process. The details of the cache determination process are given later referring to FIGS. 5A and 5B.

In a case where it is determined in Step S111 that the block data of a file to be written is not present in the server cache 130, the OS 110 executes a cache registration process for storing the block data to be written into the server cache 130 (Step S117). The details of the cache registration process are given later referring to FIG. 6.

The OS 110 transmits a write request to the storage system 200 (Step S118), and transmits a notification of completion to the application 120 (Step S119). Further, the OS 110 updates the access information 115 (Step S120).

The processes of Steps S118, S119, and S120 are the same as the processes of Steps S113, S114, and S115, and hence their descriptions are omitted.

The OS 110 executes a cache determination process (Step S121), and then terminates the processing. Specifically, the cache driver 113 executes the cache determination process. The details of the cache determination process are given later referring to FIGS. 5A and 5B.

In a case of receiving a read request or a write request from the server 100, the storage system 200 executes the following processing.

In a case of receiving a read request from the server 100, the storage system 200 determines whether or not block data to be read is stored in the storage cache 220.

In a case where it is determined that block data to be read is stored in the storage cache 220, the storage system 200 transmits data stored in the storage cache 220 to the server 100.

In a case where it is determined that the block data to be read is not stored in the storage cache 220, the storage system 200 secures a storage area in the storage cache 220, and reads block data from the storage medium 206. Further, the storage system 200 stores the read block data into the secured storage area, and transmits the block data to the server 100.

In a case of receiving a write request from the server 100, the storage system 200 determines whether or not block data to be written is stored in the storage cache 220.

In a case where it is determined that the block data to be written is stored in the storage cache 220, the storage system 200 updates block data stored in the storage cache 220, and transmits a notification of completion to the server 100. Then, the storage system 200 writes the block data stored in the storage cache 220 into a predetermined storage area in the storage medium 206.

In a case where it is determined that the block data to be written is not stored in the storage cache 220, the storage system 200 secures a storage area in the storage cache 220, stores the block data to be written into the secured storage area, and transmits a notification of completion to the server 100. Then, the storage system 200 writes the block data to be stored into the storage cache 220 in a predetermined storage area in the storage medium 206.

The cache determination process may be executed after the process of Step S105.

Figure 5A:
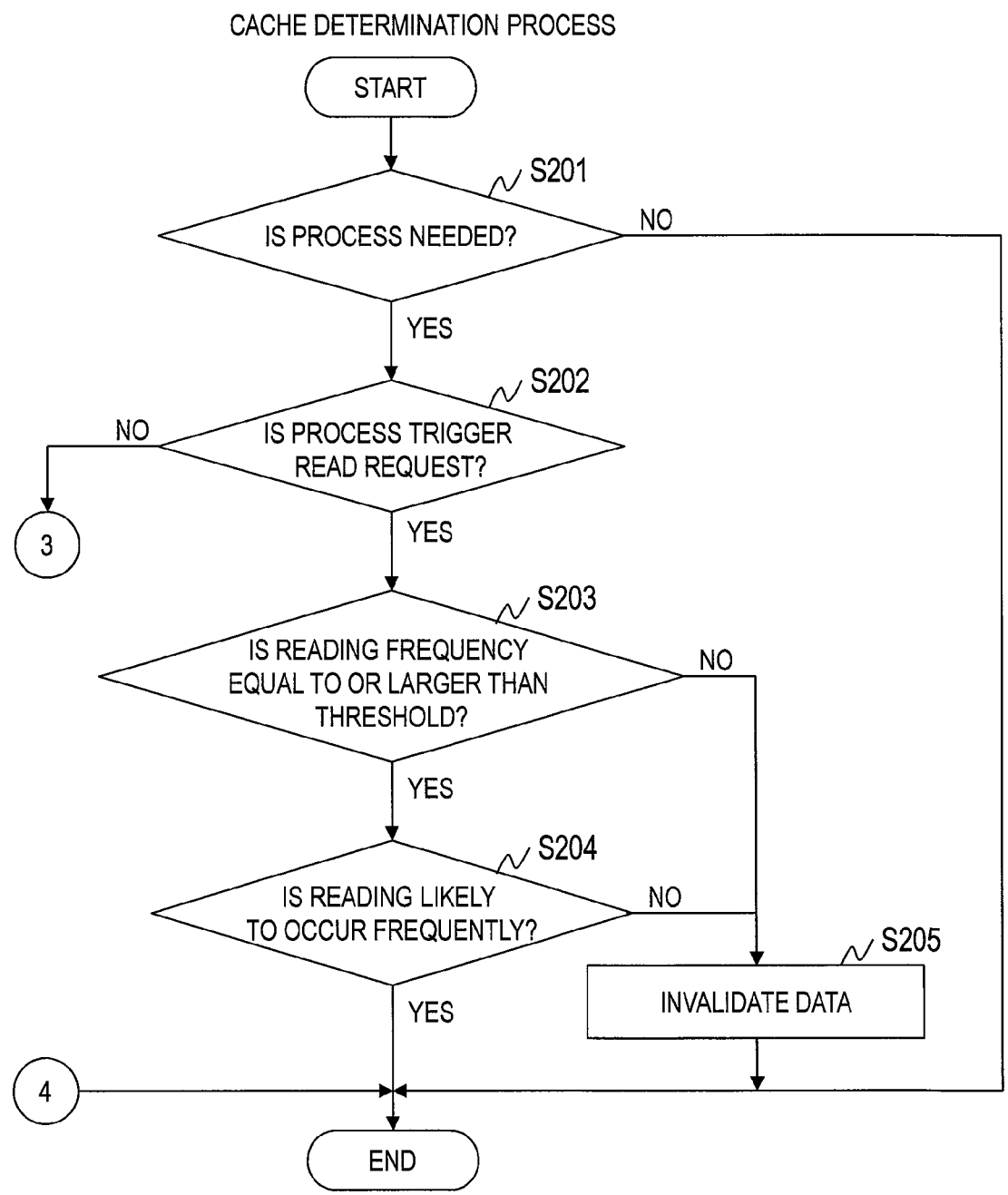
FIGS. 5A and 5B are flowcharts illustrating an example of a cache determination process according to the first embodiment of this invention.
Figure 5B:
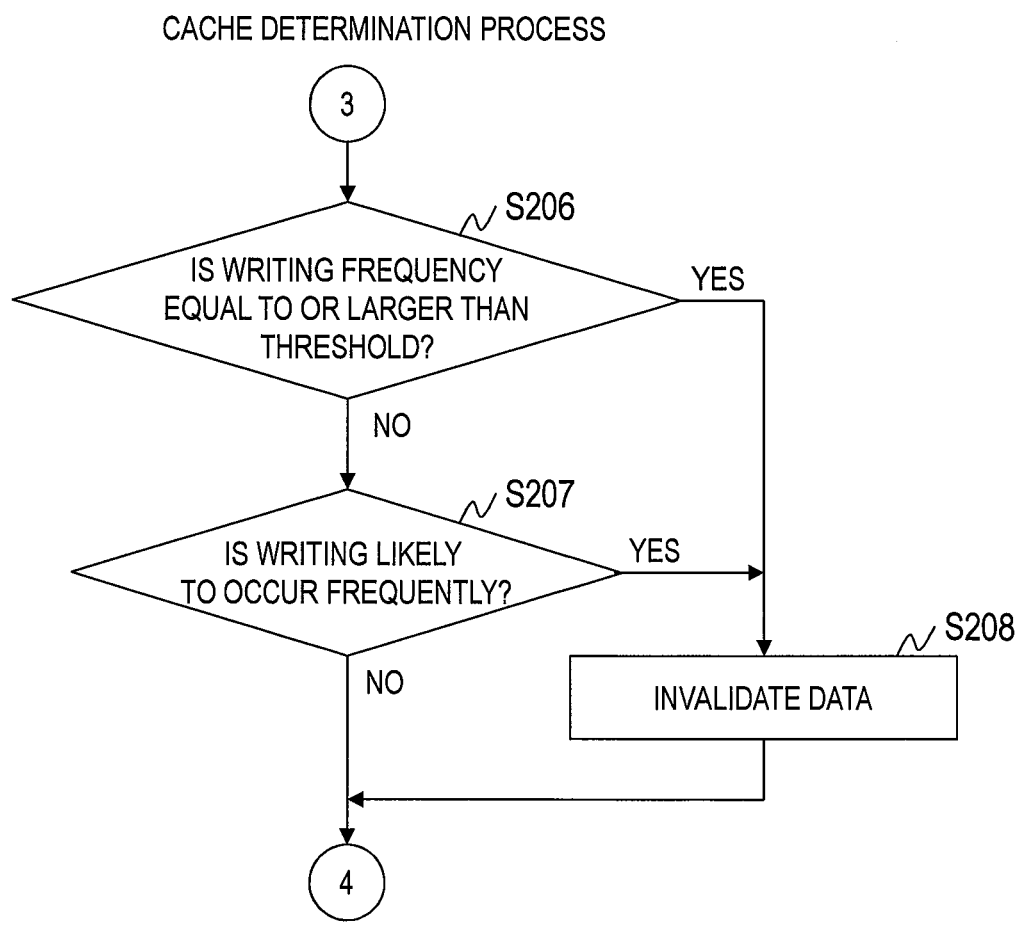

FIGS. 5A and 5B are flowcharts illustrating an example of the cache determination process according to the first embodiment of this invention.

The cache driver 113 updates the access information 115, and then executes the cache determination process to be described below. In a case where there are a plurality of pieces of block data to be processed, the cache driver 113 repeatedly performs the following process on each block data.

The cache driver 113 determines whether or not the cache determination process needs to be executed (Step S201). For example, it is determined whether or not the following expression (1) is fulfilled.

Expression (1)

$$\text{Read Cntr} + \text{Write Cntr} \geq J \tag{1}$$

In the expression, the variable Read Cntr represents the value of Read 303 of a reading-target block data, the variable Write Cntr represents the value of Write 304 of the reading-target block data, and J represents a threshold. In a case where the expression (1) is fulfilled, it is determined that the cache determination process needs to be executed.

The access characteristics of block data or the like read for the first time are not known. According to this embodiment, therefore, the server 100 monitors the access states of block data for a certain period of time. Although the access frequency is used in this embodiment, an access time or the like may be used as well.

In a case where it is determined that the cache determination process need not to be executed, the cache driver 113 terminates the processing.

In a case where it is determined that the cache determination process needs to be executed, the cache driver 113 determines whether or not a process trigger is a read request (Step S202). In Step S202 and subsequent steps, the cache driver 113 analyzes the access characteristics of the reading-target block data.

In a case where it is determined that a process trigger is a read request, the cache driver 113 determines whether or not the frequency of reading the reading-target block data is equal to or larger than a predetermined threshold (Step S203). For example, it is determined whether or not the following expression (2) is fulfilled.

Expression (2)

$$\text{Read Cntr} \geq K \tag{2}$$

In the expression, K represents a threshold. In a case where the expression (2) is fulfilled, it is determined that the frequency of reading the reading-target block data is equal to or larger than the predetermined threshold.

In a case where it is determined that the frequency of reading the reading-target block data is less than the predetermined threshold, the cache driver 113 invalidates the reading-target block data stored in the server cache 130 (Step S205), and terminates the processing.

In a case where it is determined that the frequency of reading the reading-target block data is equal to or larger than the predetermined threshold, the cache driver 113 determines whether or not the reading-target block data is likely to be read frequently (Step S204). For example, it is determined whether or not the following expression (3) is fulfilled.

Expression (3)

$$\frac{\text{Read Cntr}}{\text{Write Cntr}} \geq L \tag{3}$$

In the expression, L represents a threshold. The expression (3) is a conditional expression for determining whether or not an access ratio calculated by dividing Read 303 by Write 304 is equal to or larger than a predetermined threshold. In a case where the expression (3) is fulfilled, it is determined that the reading-target block data is likely to be read frequently.

In a case where it is determined that the reading-target block data is not likely to be read frequently, the cache driver 113 invalidates the reading-target block data stored in the server cache 130 (Step S205), and terminates the processing.

According to this embodiment, the OS 110 performs control so that even when the frequency of reading block data is large, block data which is to be frequently written is not stored into the server cache 130. This is because that frequent writing of data may degrade the writing performance of the cache device 103, or execution of the writing process may delay the process of reading block data.

In a case where it is determined that the reading-target block data is likely to be read frequently, the cache driver 113 terminates the processing.

In a case where it is determined in Step S202 that the process trigger is not a read request, in other words, the process trigger is a write request, the cache driver 113 determines whether or not the frequency of writing block data to be written is equal to or larger than a predetermined threshold (Step S206). For example, it is determined whether or not the following expression (4) is fulfilled.

Expression (4)

$$\text{Write Cntr} \geq M \quad (4)$$

In the expression, M represents a threshold. In a case where the expression (4) is fulfilled, it is determined that the frequency of writing block data to be written is equal to or larger than the predetermined threshold.

In a case where it is determined that the frequency of writing block data to be written is equal to or larger than the predetermined threshold, the cache driver 113 invalidates the block data stored in the server cache 130 (Step S208), and terminates the processing.

In a case where it is determined that the frequency of writing block data to be written is less than the predetermined threshold, the cache driver 113 determines whether or not the block data to be written has a high tendency to write. In other words, the cache driver 113 determines whether or not the block data to be written is likely to be written frequently (Step S207). For example, it is determined whether or not the following expression (5) is fulfilled.

Expression (5)

$$\frac{\text{Write Cntr}}{\text{Read Cntr}} \geq N \quad (5)$$

In the expression, N represents a threshold. The expression (5) is a conditional expression for determining whether or not an access ratio calculated by dividing Write 304 by Read 303 is equal to or larger than a predetermined threshold. In a case where the expression (5) is fulfilled, it is determined that the block data to be written has a high tendency to write.

In a case where it is determined that the block data to be written has a high tendency to write, the cache driver 113 invalidates the block data stored in the server cache 130 (Step S208), and terminates the processing.

According to this embodiment, the OS 110 performs control so that even when the frequency of writing block data is small, block data which is to be frequently written is not stored into the server cache 130. This can suppress degradation of the writing performance of the cache device 103, and improve the performance of an application.

In a case where it is determined that the block data to be written does not have a high tendency to write, the cache driver 113 terminates the processing.

Figure 6:
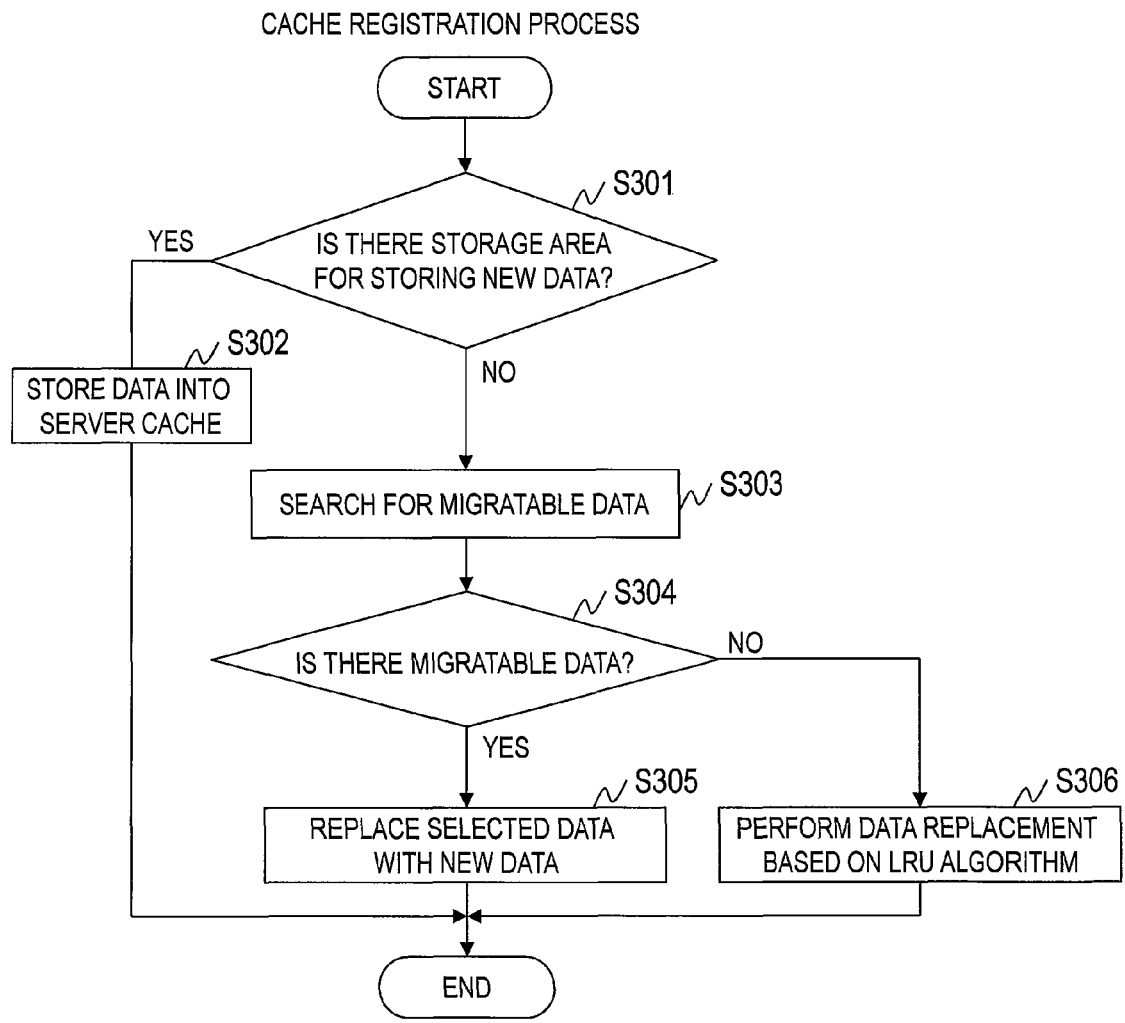
FIG. 6 is a flowchart illustrating an example of a cache registration process according to the first embodiment of this invention.

FIG. 6 is a flowchart illustrating an example of the cache registration process according to the first embodiment of this invention.

In the following description, block data to be newly stored into the server cache 130 is also described as new block data.

The cache driver 113 determines whether or not there is a storage area in the server cache 130 for storing new block data (Step S301).

For example, the cache driver 113 inquires the OS 110 about a free space in the server cache 130 to determine whether or not the free space in the server cache 130 is greater than the volume of new block data.

In a case where it is determined that there is a storage area in the server cache 130 for storing new block data, the cache driver 113 stores the new block data into the server cache 130 (Step S302), and terminates the processing.

Specifically, the cache driver 113 generates a buffer cache in a free storage area, and stores the new block data into the generated buffer cache.

In a case where it is determined that the server cache 130 does not have a storage area for storing new block data, the cache driver 113 retrieves migratable block data based on the access characteristics of block data to be stored into the server cache 130 (Step S303), and determines whether or not there is migratable block data based on the retrieve result (Step S304). For example, it is determined whether or not there is at least one block data that fulfills the following expression (6).

Expression (6)

$$\frac{\text{Write Cntr}}{\text{Read Cntr}} < N \quad (6)$$

In a case where there is at least one block data that fulfills the expression (6), it is determined that there is migratable block data.

In a case where it is determined that there is migratable block data, the cache driver 113 selects one block data from the retrieved block data, and replaces the selected block data with the new block data (Step S305).

Specifically, the cache driver 113 removes the selected block data, and stores the new block data into the buffer cache where the removed block data is stored. In a case where there are a plurality of pieces of data fulfilling the expression (6), the cache driver 113 selects block data which provides the smallest access ratio on the left-hand side of the expression (6).

In a case where it is determined that migratable block data does not exist, the cache driver 113 performs replacement of block data based on the LRU algorithm (Step S306), and terminates the processing. The data replacement based on the LRU algorithm may use a known technology, and hence its detailed description is omitted.

Figure 7:
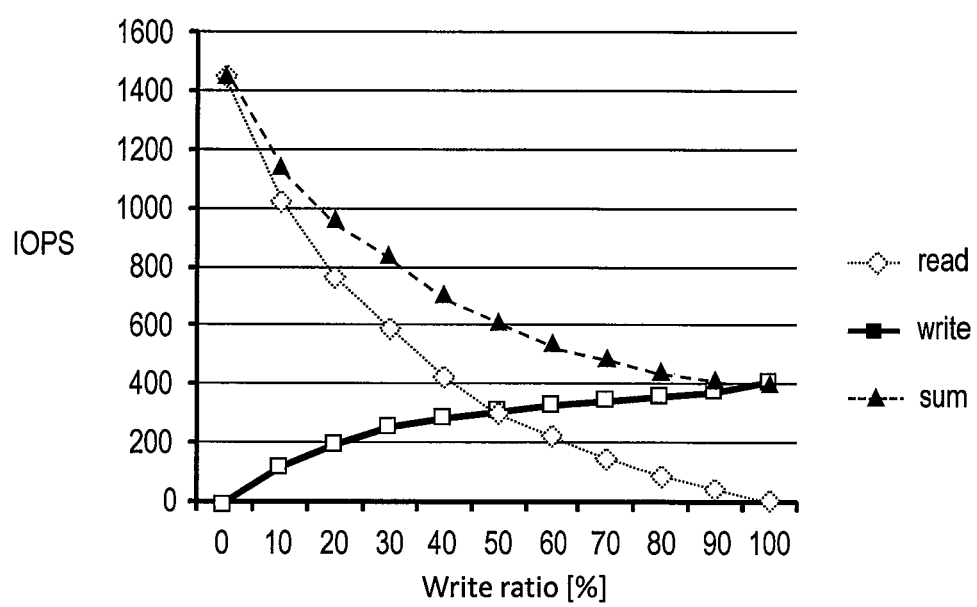
FIG. 7 is a graph showing the effects of this invention.

FIG. 7 is a graph showing the effects of this invention.

FIG. 7 is a graph showing the access performance of the storage system 200. The ordinate of the graph represents input/output per second (IOPS) in the storage system 200, and the abscissa represents the writing ratio.

As shown in FIG. 7, the writing performance of the storage system 200 lowers along with an increase in the reading ratio. Accordingly, the performance of the related-art storage system 200 is optimized by adjusting the writing ratio to about 50%.

According to this invention, block data which is read frequently by the application 120 is automatically stored into the server cache 130. Block data which is written frequently by the application 120 is stored only into the storage cache 220.

The server 100 according to this invention accesses the server cache 130 in the reading process, and accesses the storage cache 220 in the writing process. As a result, the writing ratio of the storage system 200 becomes close to 100%. Therefore, the writing performance is significantly improved compared to the related-art writing performance.

The first embodiment can achieve cache control that improves the processing performance of the computer system. Specifically, the processing performance of the computer system is improved by the following effects.

The server 100 stores data to be read from the application 120 into the server cache 130. In other words, the server cache 130 is used as an exclusive reading cache. This ensures fast data reading.

Data which is written frequently is not stored into the server cache 130, and hence it is possible to suppress writing-originated degradation of the performance of the server cache 130. Further, the number of read requests that are transmitted from the server 100 to the storage system 200 is reduced. This allows the storage system 200 to perform the writing process to the limit of the performance of the storage system 200.

In addition, the server 100 automatically controls block data to be stored into the server cache 130 based on the access characteristics of data. Therefore, a system administrator or a user or the like who uses the application 120 need not set up information on cache control beforehand.

Second Embodiment

According to the first embodiment, the OS 110 stores block data into the server cache 130 once, and then executes the cache determination process. According to a second embodiment of this invention, the OS 110 executes the cache determination process, and determines whether or not to store block data into the server cache 130 based on the result of the cache determination process. The following description is mainly focused on the differences from the first embodiment.

The configurations of the computer system, the server 100, and the storage system 200 according to the second embodiment are identical to those of the first embodiment, and hence their descriptions are omitted.

Figure 8A:
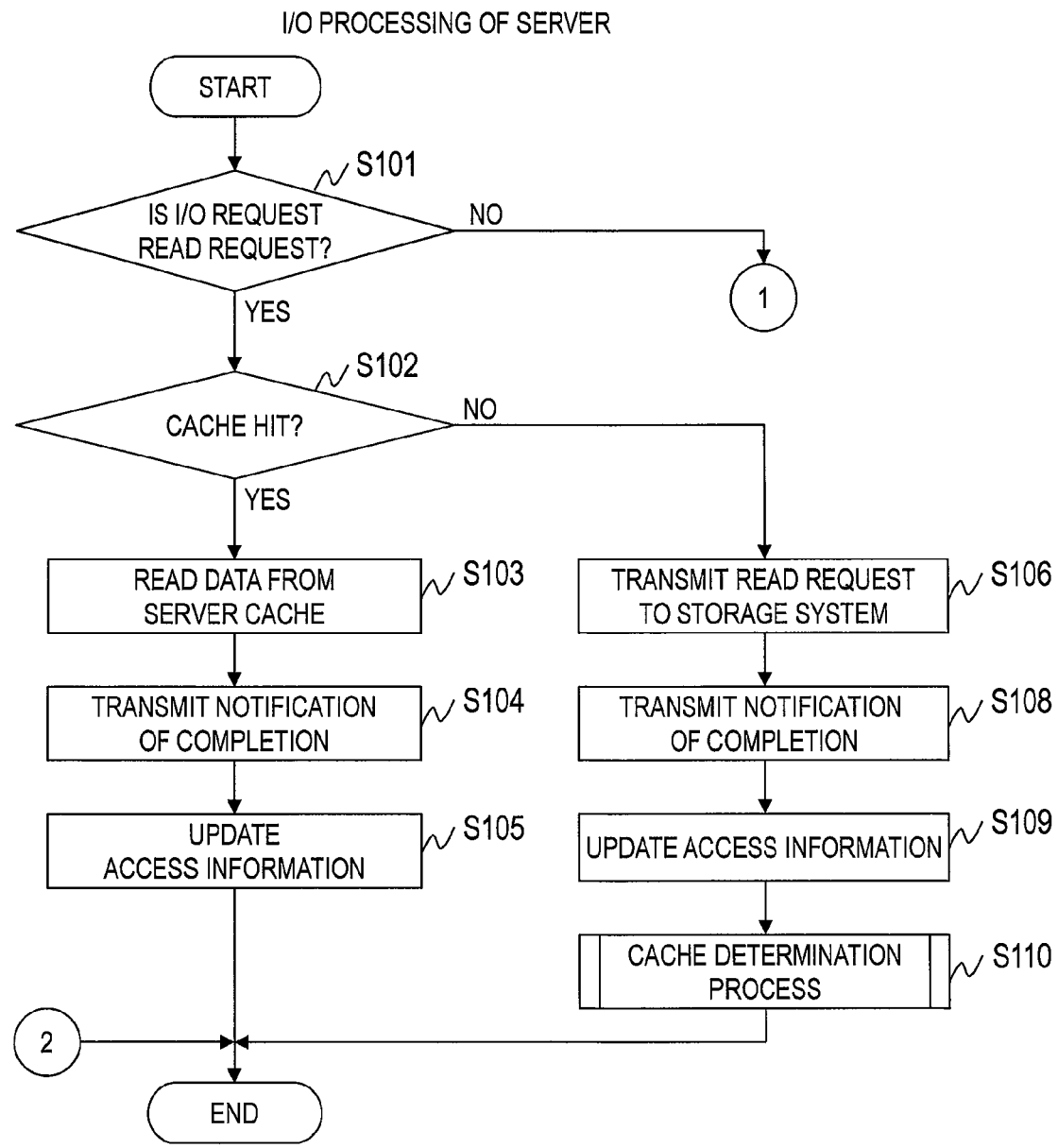
FIGS. 8A and 8B are flowcharts illustrating an example of I/O processing that is performed by the server according to a second embodiment of this invention.
Figure 8B:
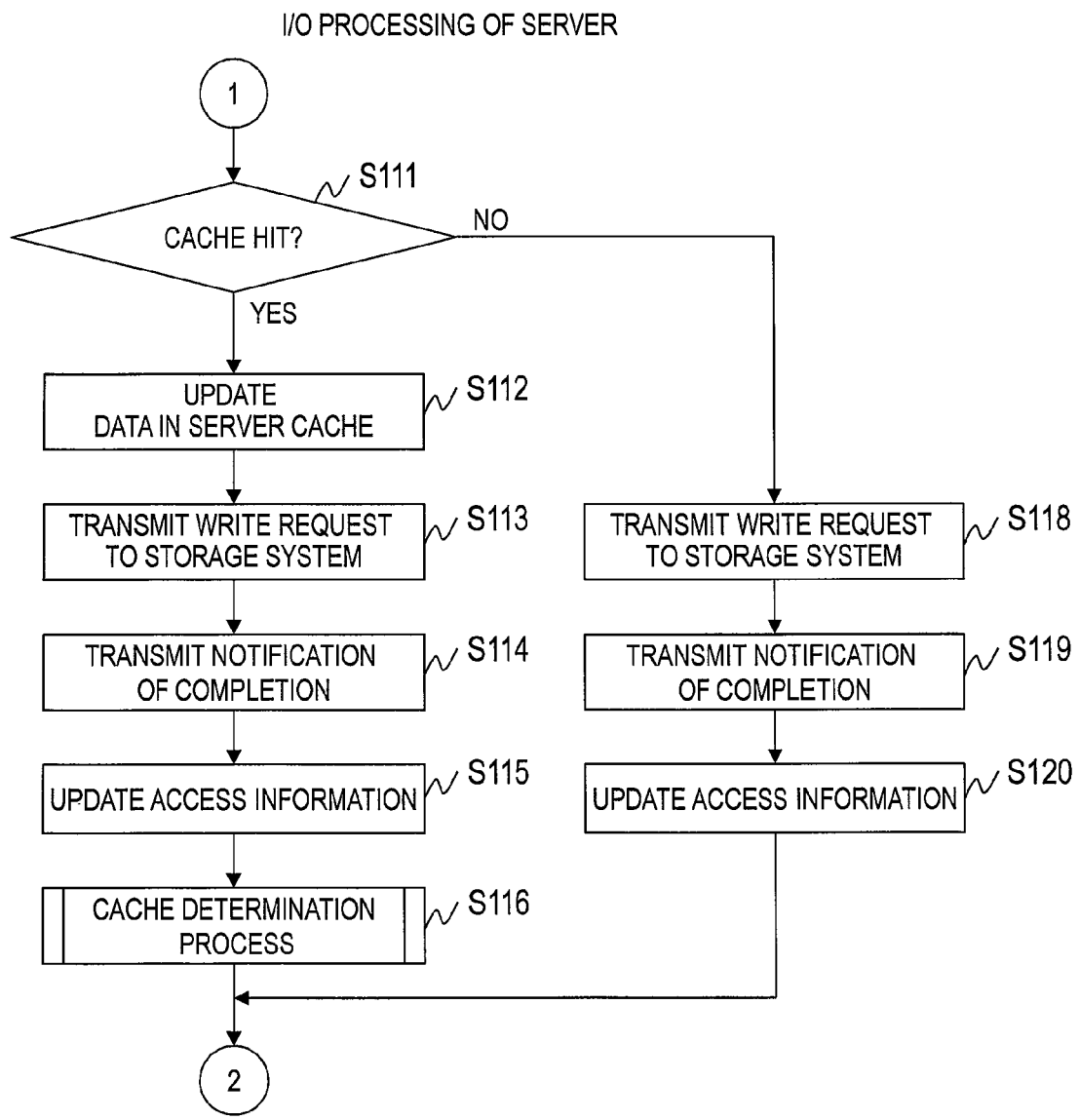

FIGS. 8A and 8B are flowcharts illustrating an example of I/O processing that is performed by the server 100 according to the second embodiment of this invention.

After the process of Step S106, the OS 110 does not execute the cache registration process, but transmits a notification of completion to the application 120 (Step S108). According to the second embodiment, it is determined based on the result of the cache determination process whether or not to execute the cache registration process. This can reduce an increase in the frequency of writing data into the cache device 103.

In a case where it is determined in Step S111 that block data in a file to be written does not exist in the server cache 130, the OS 110 does not execute the cache registration process or the cache determination process, and transmits a write request to the storage system 200 (Step S118).

After the process of Step S120, the OS 110 terminates the processing without executing the cache determination process. In other words, the cache driver 113 does not store block data into the server cache 130 at the time of the writing process. This can reduce an increase in the frequency of writing data into the cache device 103.

Figure 9A:
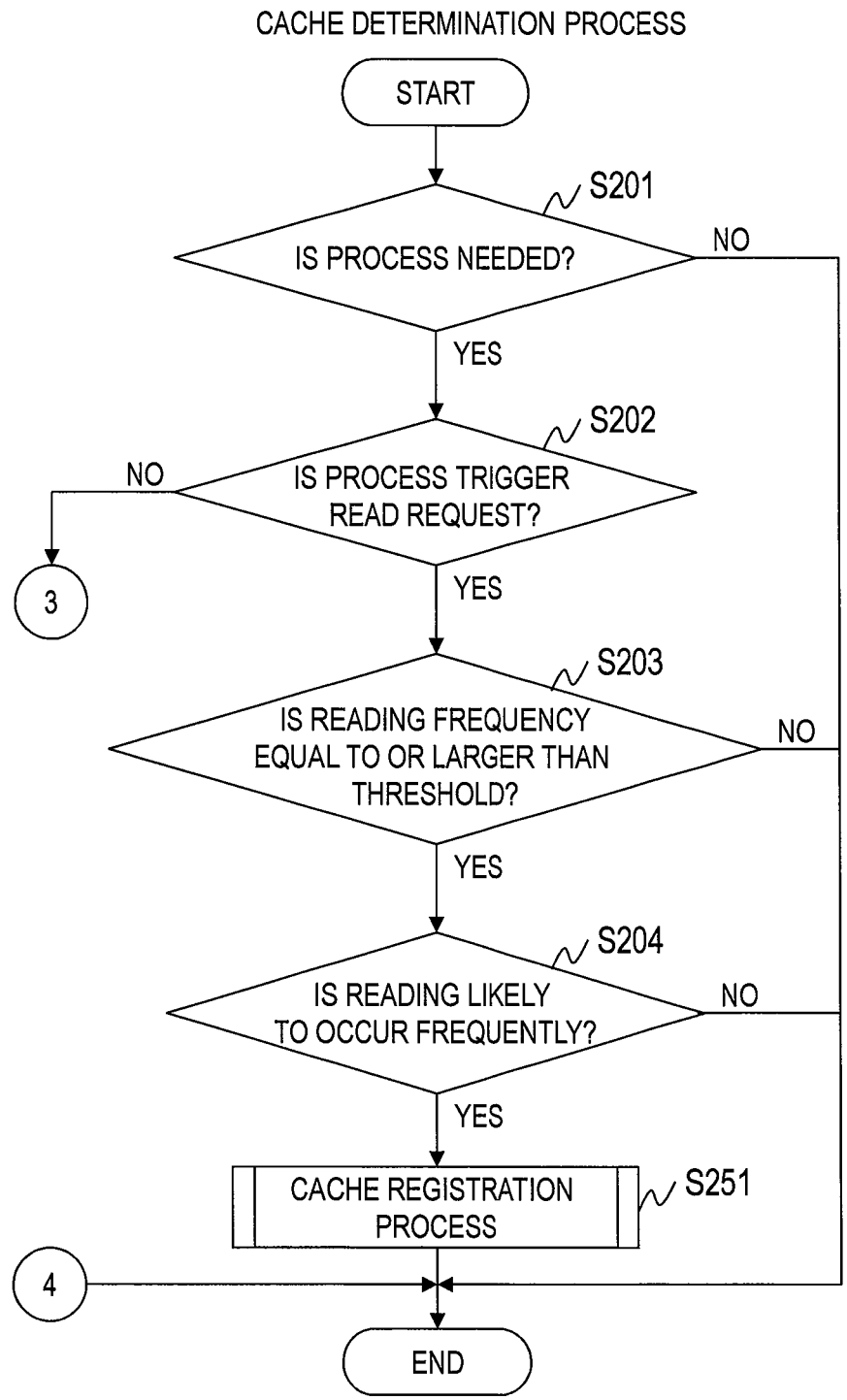
FIGS. 9A and 9B are flowcharts illustrating an example of the cache determination process according to the second embodiment of this invention.
Figure 9B:
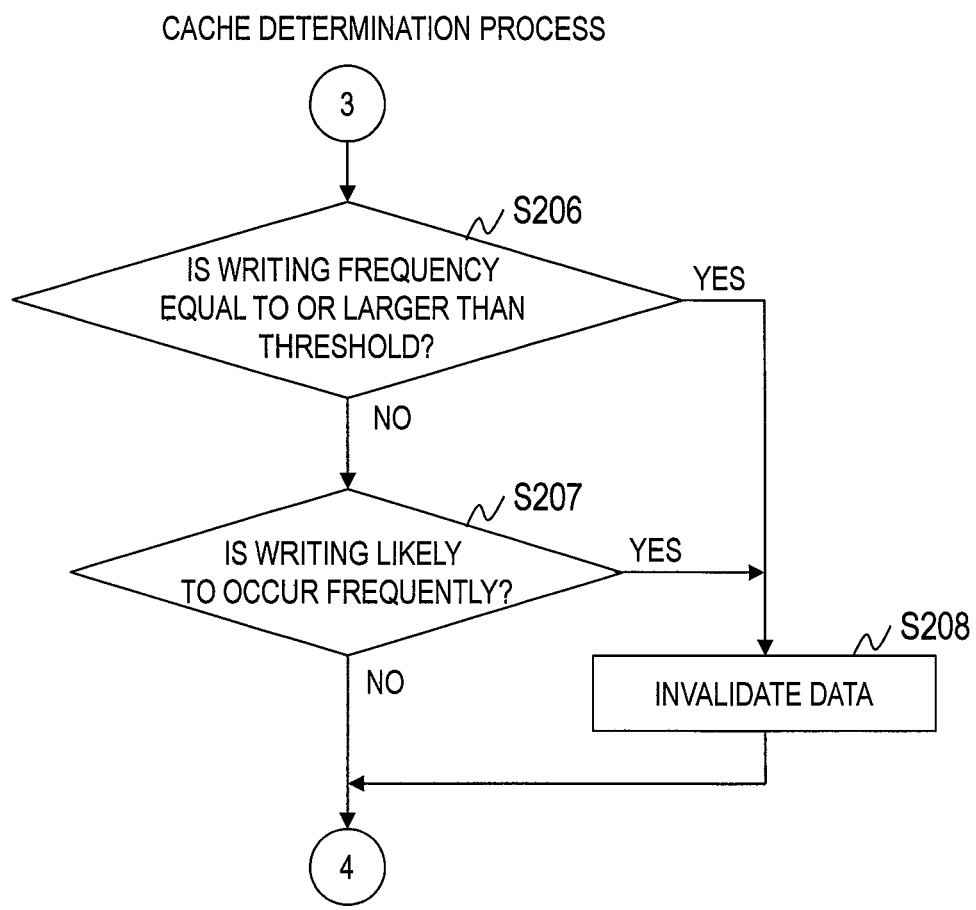

FIGS. 9A and 9B are flowcharts illustrating an example of the cache determination process according to the second embodiment of this invention.

In a case where it is determined in Step S203 that the frequency of reading the reading-target block data is less than a predetermined threshold, the cache driver 113 terminates the processing. Block data is not stored in the server cache 130 according to the second embodiment, and hence the process of invalidating the block data is omitted.

In a case where it is determined in Step S204 that the reading-target block data is likely to be read frequently, the cache driver 113 executes the cache registration process (Step S251).

Because the cache driver 113 may not hold block data at this point of time, it is necessary to obtain the reading-target block data. For example, the cache driver 113 transmits a read request to the storage system 200 again to obtain the reading-target block data.

It should be noted that the cache registration process is the same as that of the first embodiment, and hence its description is omitted.

According to the second embodiment, the frequency of writing data into the cache driver 113 is reduced, and hence it is possible to suppress the degradation of the performance of the cache device 103 such as SSD whose number of writing accesses is limited.

Third Embodiment

According to the first embodiment, the storage location of block data is controlled based on the access characteristics of block data. A third embodiment of this invention differs from the first embodiment in that the OS 110 controls the storage location of data in a file based on the file access performance. The following description is mainly focused on the differences from the first embodiment.

The configuration of the computer system, and the hardware configurations and the software configurations of the server 100 and the storage system 200 according to the third embodiment are identical to those of the first embodiment, and hence their descriptions are omitted. The third embodiment differs from the first embodiment in the contents of the access information 115.

FIG. 10 is an explanatory diagram illustrating an example of the access information 115 according to the third embodiment of this invention.

The access information 115 according to the third embodiment includes a file identifier 305. The file identifier 305 is information for uniquely identifying a file. For example, the file identifier 305 stores a file name and a file path.

According to the third embodiment, the block number 301 stores a number indicating the storage location of block data in a file in the storage system 200. Other information is the same as that in the first embodiment, and hence its description is omitted.

Next, the processing in the third embodiment is described.

The I/O processing of the server 100 according to the third embodiment differs from the first embodiment in the following point.

In Steps S104, S108, S115 and S120, the cache driver 113 updates the value of the access type 302 for each block data constituting a file.

The other processes are identical to those of the first embodiment, and hence their descriptions are omitted.

The cache determination process according to the third embodiment differs from the first embodiment in the following points.

In Step S203, the cache driver 113 determines whether or not the frequency of reading a file including the reading-target block data is equal to or larger than a predetermined threshold. For example, it is determined whether or not the following expression (7) is fulfilled.

Expression (7)

$$\text{Total Read Cntr} \geq P \qquad (7)$$

In the expression, variable Total Read Cntr represents the frequency of reading a file including the reading-target block data, and P represents a threshold. In a case where the expression (7) is fulfilled, it is determined that the frequency of reading a file including the reading-target block data is equal to or larger than the predetermined threshold.

A value which is stored in Total Read Cntr is calculated as follows.

The cache driver 113 refers to the block number 301 in the access information 115 to specify a file including the reading-target block data.

The cache driver 113 calculates Total Read Cntr by adding Read 303 of every block data included in the specified file.

In Step S204, the cache driver 113 determines whether or not the file including the reading-target block data is likely to be read frequently. For example, it is determined whether or not the following expression (8) is fulfilled.

Expression (8)

$$\frac{\text{Total Read Cntr}}{\text{Total Write Cntr}} \geq Q \qquad (8)$$

In the expression, variable Total Write Cntr represents the frequency of writing in a file including block data to be written, and Q represents a threshold. In a case where the expression (8) is fulfilled, it is determined that the file including the reading-target block data is likely to be read frequently. The scheme of calculating the value to be stored in Total Write Cntr is the same as the scheme of calculating the value to be stored in Total Read Cntr, and hence its description is omitted.

In Step S206, the cache driver 113 determines whether or not the frequency of writing a file including block data to be written is equal to or larger than a predetermined threshold. For example, it is determined whether or not the following expression (9) is fulfilled.

Expression (9)

$$\text{Total Write Cntr} \geq R \qquad (9)$$

In the expression, R represents a threshold. In a case where the expression (9) is fulfilled, it is determined that the frequency of writing a file including block data to be written is equal to or larger than the predetermined threshold.

In Step S207, the cache driver 113 determines whether or not the file including block data to be written has a high tendency to write. For example, it is determined whether or not the following expression (10) is fulfilled.

Expression (10)

$$\frac{\text{Total Write Cntr}}{\text{Total Read Cntr}} \geq S \qquad (10)$$

In the expression, S represents a threshold. In a case where the expression (10) is fulfilled, it is determined that the file including block data to be written has a high tendency to write.

Next, the cache registration process is described.

The cache driver 113 first selects one block data included in a file. For example, the cache driver 113 selects block data with a small block number. Then, the cache driver 113 performs processes of Steps S301 to S306 on the selected block data.

The cache driver 113 repeatedly performs the same processing on every block data included in the file.

According to the third embodiment, cache control can be performed file by file.

The description of the embodiment is directed to the example of using the control by hardware, but it is also possible to realize a part thereof by software.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system, comprising:
a server including a first processor, a first memory, a cache device in which a server cache is set, and a first interface, where the first memory stores instructions that, when executed by the processor, causes the processor to:
execute an operating system for controlling the server, the operating system including a cache driver for controlling the server cache,
execute an application providing a service, and store data used by the application in the server cache,
a storage system including a second processor, a second memory, and a second interface coupled to the first interface, and a plurality of storage devices for storing data used by the application, where the second memory includes a storage cache for temporarily storing data to be written to the storage devices, and instructions that, when executed by the second processor, cause the second processor to:
control the storage system,
wherein the operating system is configured to hold access information storing a frequency of reading data from a plurality of areas of the storage devices and a frequency of writing data to the plurality of areas of the storage devices, and
wherein the cache driver is configured to:
update the access information when an I/O request is received from the application;
analyze access characteristics of a target area of the I/O request based on the updated access information;
determine whether to store data of the I/O request in the server cache based on the frequency of reading data from the target area and frequency of writing data to the target area;
when the target area is frequently written, storing the data of the I/O request in the storage cache;
when the target area is frequently read, storing the data of the I/O request in the server cache; and
wherein, when the I/O request is a read request to read first data in the target area, the cache driver is configured to:
determine whether the first data is stored in the server cache;
when the first data is not stored in the server cache, transmit the read request to the storage system;
update the frequency of reading the target area in the access information;
determine whether the target area is frequently read by the application based on the updated access information; and
when the target area is frequently read by the application, store the first data into the server cache, and
wherein, when the I/O request is a write request to write second data in the target area, the cache driver is configured to:
determine whether the data of the target area is stored in the server cache;
when the data of the target area is stored in the server cache, update the data of the target area in the server cache with the second data;
transmit the write request to the storage system;
update the frequency of writing the target area in the access information;
determine whether the target area is frequently written by the application based on the updated access information; and
when the target area is frequently written by the application, invalidate the second data stored in the server cache.

2. The computer system according to claim 1, wherein the cache device is a flash memory.

3. A cache control method for a computer system including a server connected to a storage system,
the server including a first processor, a first memory, a cache device in which a server cache for temporarily storing data is set up, where the first memory stores instructions that, when executed by the processor, causes the processor to execute an application providing a service, execute an operating system for controlling the server, the operating system including a cache driver for controlling the server cache, and store data used by the application in the server cache,
the storage system including a second processor, a second memory, and a second interface coupled to the first interface, and a plurality of storage devices for storing data used by the application
the second memory of the storage system including a storage cache for temporarily storing data to be written to the storage devices and instructions that, when executed by the second processor, cause the second processor to control the storage system,
the operating system being configured to hold access information storing a frequency of reading data and a frequency of writing data,
the cache control method including:
storing, by the operating system, access information including a frequency of reading data from a plurality of areas of the storage devices and a frequency of writing data to the plurality of areas of the storage devices;
receiving, by the cache driver, an I/O request from an application executed by a server for a target area of the storage devices;
updating, by the cache driver, the access information based on the I/O request;
analyzing, by the cache driver, characteristics of a target area of the I/O request based on the updated access information;
determining, by the cache driver, whether to store data of the I/O request in the server cache based on the frequency of reading data from the target area and frequency of writing data to the target area;
when the target area is frequently written, storing the data of the I/O request in the storage cache;
when the target area is frequently read, storing the data of the I/O request in the server cache; and
wherein, when the I/O request is a read request to read first data in the target area, the analyzing, by the cache driver, of the characteristics of the target area of the read request based on the updated access information includes:
determining whether the first data is stored in the server cache;
when the first data is not stored in the server cache, transmitting the read request to the storage system;
updating the frequency of reading the target area in the access information;
determining whether the target area is frequently read by the application based on the updated access information; and
the determining, by the cache driver, whether to store the data of the read request in the server cache includes, when the target area is frequently read by the application, storing the first data into the server cache, and
wherein, when the I/O request is a write request to write second data in the target area, the analyzing, by the cache driver, of the characteristics of the target area of the read request based on the updated access information includes:
determining whether the data of the target area is stored in the server cache;
when the data of the target area is stored in the server cache, updating the data of the target area in the server cache with the second data;

transmitting the write request to the storage system;
updating the frequency of writing the target area in the access information;
determining whether the target area is frequently written by the application based on the updated access information; and
the determining, by the cache driver, whether to store the data of the read request in the server cache includes, when the target area is frequently written by the application, invalidating the second data stored in the server cache.

4. The cache control method according to claim 3, wherein the cache device is a flash memory.

5. A server coupled to a storage system having a storage cache and a plurality of storage devices, the server comprising:
a processor;
a memory connected to the processor;
a cache device connected to the processor and the memory, and in which a server cache for temporarily storing data is set; and
an interface coupled to the storage system,
wherein the memory stores instructions that, when executed by the processor, causes the processor to:
execute an operating system for controlling the server, the operating system including a cache driver for controlling the server cache,
execute an application providing a service,
execute an operating system for controlling the server, and
store data used by the application in the server cache,
wherein the operating system is configured to hold access information storing a frequency of reading data from a plurality of areas of the storage devices and a frequency of writing data to the plurality of areas of the storage devices,
wherein the cache driver is configured to:
update the access information when an I/O request is received from the application;
analyze access characteristics of a target area of the I/O request based on the updated access information;
determine whether to store data of the I/O request in the server cache based on the frequency of reading data from the target area and frequency of writing data to the target area;
when the target area is frequently written, transmitting the data of the I/O request to the storage system to be stored in the storage cache;
when the target area is frequently read, storing the data of the I/O request in the server cache; and
wherein, when the I/O request is a read request to read first data in the target area, the cache driver is configured to:
determine whether the first data is stored in the server cache;
when the first data is not stored in the server cache, transmit the read request to the storage system;
update the frequency of reading the target area in the access information;
determine whether the target area is frequently read by the application based on the updated access information; and
when the target area is frequently read by the application, store the first data into the server cache, and
wherein, when the I/O request is a write request to write second data in the target area, the cache driver is configured to:

determine whether the data of the target area is stored in the server cache;
when the data of the target area is stored in the server cache, update the data of the target area in the server cache with the second data;
transmit the write request to the storage system;
update the frequency of writing the target area in the access information;
determine whether the target area is frequently written by the application based on the updated access information; and
when the target area is frequently written by the application, invalidate the second data stored in the server cache.

6. The server according to claim 5, wherein the cache device is a flash memory.

7. A server coupled to a storage system having a storage cache and a plurality of storage devices, the server comprising:
a processor;
a memory connected to the processor;
a cache device connected to the processor and the memory, and in which a server cache for temporarily storing data is set; and
an interface coupled to the storage system,
wherein the memory stores instructions that, when executed by the processor, causes the processor to:
execute an operating system for controlling the server, the operating system including a cache driver for controlling the server cache,
execute an application providing a service,
execute an operating system for controlling the server, and
store data used by the application in the server cache,
wherein the operating system is configured to hold access information storing a frequency of reading data from a plurality of areas of the storage devices and a frequency of writing data to the plurality of areas of the storage devices,
wherein the cache driver is configured to:
update the access information when an I/O request is received from the application;
analyze access characteristics of a target area of the I/O request based on the updated access information;
determine whether to store data of the I/O request in the server cache based on the frequency of reading data from the target area and frequency of writing data to the target area;
when the target area is frequently written, transmitting the data of the I/O request to the storage system to be stored in the storage cache;
when the target area is frequently read, storing the data of the I/O request in the server cache; and
wherein, when the I/O request is a read request to read first data in the target area, the cache driver is configured to:
determine whether the first data is stored in the server cache;
when the first data is not stored in the server cache, transmit the read request to the storage system;
store the first data received from the storage system into the server cache;
update the frequency of reading the target area in the access information;
determine whether the target area is frequently read by the application based on the updated access information; and when the target area is not frequently read by the application, invalidate the first data stored in the server cache, and wherein, when the I/O request is a write request to write second data in the target area, the cache driver is configured to:

determine whether the data of the target area is stored in the server cache;

when the data of the target area is stored in the server cache, update the data of the target area in the server cache with the second data;

transmit the write request to the storage system;

update the frequency of writing the target area in the access information;

determine whether the target area is written frequently by the application based on the updated access information; and when the target area is frequently written by the application, invalidate the second data stored in the server cache.

* * * * *